June 23, 1953 C. W. LINCOLN ET AL 2,643,308
DIRECTION SIGNAL SWITCH
Filed Dec. 9, 1949 2 Sheets-Sheet 1

Inventors
Cloves W. Lincoln,
Philip B. Zeigler,
Joseph J. Verbrugge &
John F. Sloan By Willits, Helwig & Baillio
Attorneys

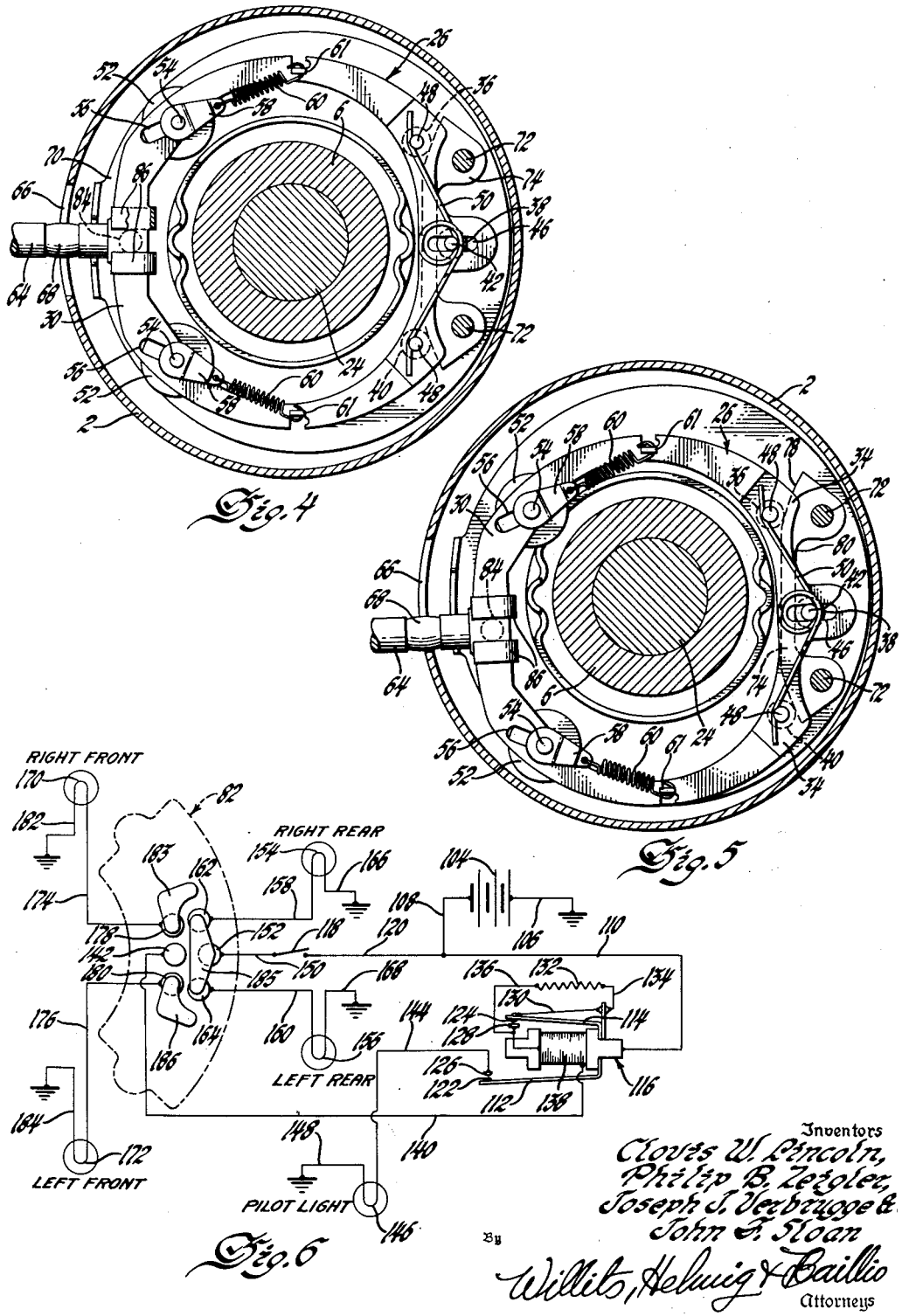

Patented June 23, 1953

2,643,308

UNITED STATES PATENT OFFICE 2,643,308

DIRECTION SIGNAL SWITCH

Clovis W. Lincoln, Philip B. Zeigler, Joseph J. Verbrugge, and John F. Sloan, Saginaw, Mich., assignors to General Motors Corporation, Detroit, Mich., a corporation of Delaware Application December 9, 1949, Serial No. 132,180

10 Claims. (Cl. 200—59)

The present invention relates to vehicle direction signaling systems comprising a plurality of signaling circuits and particularly to direction signal switches adapted to be manually set to control such circuits and automatically reset by the cooperative action of the steering mechanism.

The invention resides in an improved switch construction for such systems and has for its principal object the provision of a switch mechanism suitable for mounting concentrically on the steering column in a streamlined compact housing and particularly adapted for automatic resetting at optimum rates of acceleration to prevent overtravel of the mechanism.

This and other objects are attained in accordance with the present invention by providing a switch actuating mechanism comprising a ring assembly mounted in a housing substantially concentric with the axis of the steering shaft and manually and automatically shiftable laterally as a unit assembly in the housing.

Figure 1:
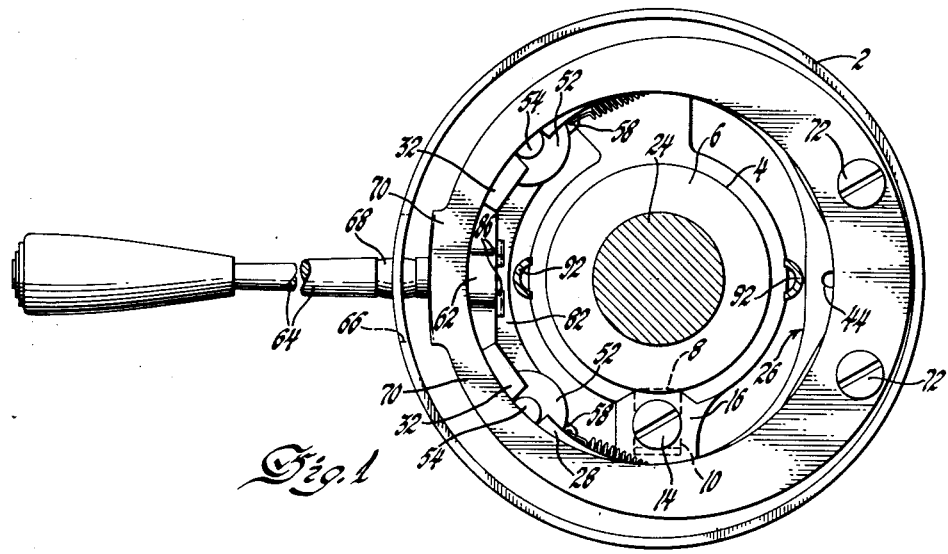
Figure 2:
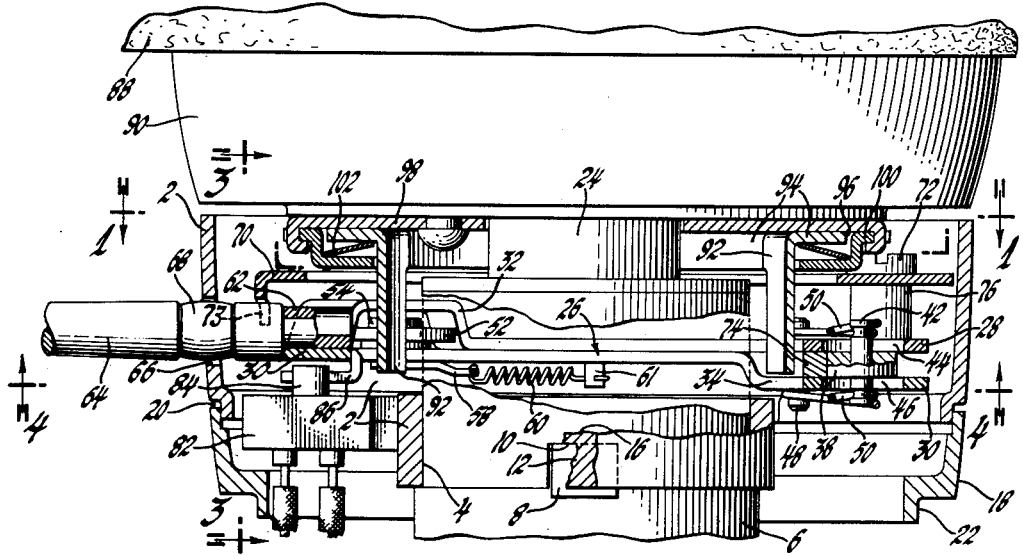
Figure 3:
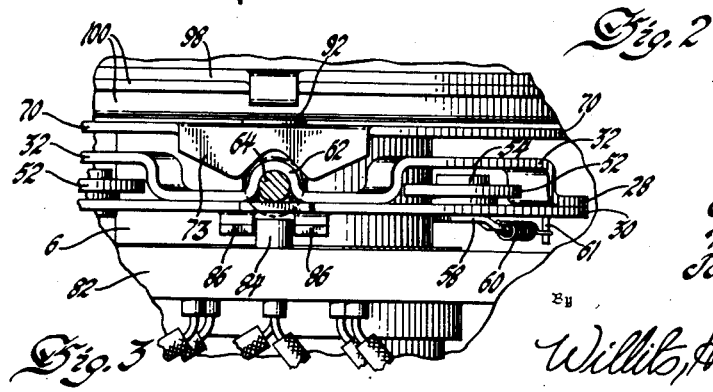

For a better understanding of the invention reference may be had to the drawings in which Figure 1 is a plan view of the switch taken along the line 1—1 of Figure 2; Figure 2 is an enlarged elevational view partly in cross section illustrating its position on a vehicle steering column adjacent the steering wheel; Figure 3 is a view taken along line 3—3 of Figure 2; Figure 4 is a view taken along line 4—4 of Figure 2; Figure 5 is a view similar to Figure 4 illustrating the switch in one of its operating positions and Figure 6 is a diagrammatic view of the direction signaling system.

Referring now to the drawings and particularly Figures 1, 2, 3, 4 and 5 there is illustrated a direction signal switch operating mechanism comprising a housing 2 having a centrally disposed aperture 4 adapted to receive the end of the steering column 6. The housing is attached to the steering column by a substantially wedge-shaped member 8 which is slidably recessed in a slot 10, Figure 1, in the wall of the housing adjacent aperture 4. One wall 12, Figure 2, of the slot is inclined to form a surface cooperating with the wedge-shaped member 8 to urge the wedge-shaped member into clamping engagement with the steering column 6. Clamping engagement is obtained by a threaded member 14 which passes through a portion 16 of the housing 2, Figure 1, forming the end wall of the slot 10. Adjustment of the threaded member 14 causes the wedge-shaped member 8 to move axially in the slot 10 along the inclined wall 12. An upward movement of the member 8 forces it into clamping relation with the steering column, and a downward movement releases the member 8 from its clamping relation.

To provide a continuous streamlined appearance between the housing 2 and the shifting lever housing, not shown, generally located on the steering column at a point below the steering wheel and the direction signal operating mechanism, an annular collar 18 is provided. As shown in Figure 2 the upper edge of collar 18 is adapted to engage an annular recess 20 in housing 2 and the lower end is provided with a recess 22 adapted to engage the upper edge of the shifting lever housing.

Positioned within the housing 2 and in substantially concentric relation with the axis of the steering shaft 24 is a ring assembly 26 comprising a pair of annular ring members 28 and 30 respectively. The ring member 28 has a pair of spaced laterally offset portions 32 and ring member 30 has a laterally offset portion 34, see Figure 2. The offset portions 32 and 34 form spaced yokes about the ring assembly when the ring members 28 and 30 have their cooperative engaging surfaces joined, as for example, by welding. Within the yoke space formed between ring member 28 and the laterally offset portion 34 of ring member 30 there are positioned three substantially equally spaced rollers 36, 38 and 40. Roller 38 is mounted for relative rotary movement on a pin 42, Figure 2, which extends through oblong slots 44 and 46 in the ring members respectively. Rollers 36 and 40 are likewise mounted for relative rotary movement on pins 48, Figures 4 and 5, which extend through circular apertures in the ring members 28 and 30. The pins 42 and 48 and the rollers 36, 38 and 40 mounted thereon are held in position in the ring assembly by springs 50. The springs 50 consist of helical loops one turn of which is adapted to be recessed in annular grooves adjacent the ends of the pin 42 and outwardly extending leg portions the ends of which are adapted to be received in annular grooves adjacent the ends of pins 48 as shown. As the position of pins 48 and rollers 36 and 40 are fixed with respect to lateral movement in the ring assembly the spring members 50 yieldingly urge the pin 42 and roller 38 toward the inner extreme position of the oblong slots 44 and 46.

Positioned within each of the spaces formed between the ring member 30 and the laterally offset portions 32 of ring member 28 there is a circular dog 52. The circular dogs 52 are mounted on headed rivets or pins 54 which extend through oblong slots 56 in ring member 30. The rivets or pins 54 are secured in the ring member 30 for relative movement in the slots by ears 58 which in turn are connected by springs 60 to ears 61 downturned from the peripheral edge of ring member 30. With the alignment of the oblong slots 56 as shown, the springs 60 yieldingly urge the peripheral edge of the circular dogs 52 into the inner space defined by the inner edges of the ring members 28 and 30. The ring member 28 is also formed with an additional offset portion 62 which is centrally spaced between the offset portions 32 and forms with the ring member 30 a bore into which the end of an operating arm 64 is inserted. The operating arm 64 extends through an oblong opening 66 in the housing 2 and is secured in the bore formed by the ring member 30 and the offset portion 62 in ring member 28, as for example, by welding or other suitable securing means. The operating arm 64 is provided with a roller 68 which rolls on the edge surfaces of the housing formed by the opening 66 when the arm is manually operated to its extreme positions.

A detent means is provided in the housing to guide the ring assembly to its neutral and extreme positions and consists of an annular spring member 70 attached by threaded screws 72 to the housing. Substantially opposite the position of attachment of the spring member it is formed with a downturned flange portion 73, Figure 3, which has a serrated edge adapted to engage the operating arm 64 with the notches corresponding to the neutral and extreme operating positions. The spring member provides a spring detent for yieldingly urging the ring assembly into one of its neutral or operating positions.

The ring assembly 26 is mounted on an operating plate 74 which is attached to the housing by the threaded screws 72. To secure both the operating plate and ring member 70 firmly in their positions and provide suitable spacing between the members, cylindrical spacing member 76, Figure 2, are interposed therebetween. The operating plate 74, as shown in Figures 2, 4 and 5, is formed with a guiding track comprising the substantially arcuate edge 78 for engaging the rollers 36 and 40 and an edge 80 for engaging the roller 38. With a mounting arrangement for the ring assembly such as that described and shown, the lateral movement of the ring assembly in the housing is determined by the edge 78 of the guide track of operating plate 74. In this connection we have found that with such a mounting arrangement for the ring assembly the automatic resetting of the ring assembly in response to the action of the steering wheel is accomplished at an optimum rate of acceleration and thereby prevents undesirable overtraveling of the ring assembly. The preferred form of operating plate is provided with a guiding edge 78 which is substantialy arcuate and formed on a radius of curvature which falls outside of the housing and across the ring assembly from the resetting dogs. It will be understood in this connection, however, that while the preferred form of plate is provided with a substantially arcuate edge 78, an edge which is straight would also provide a satisfactory resetting rate of acceleration for the ring assembly.

Mounted within the housing 2 is a switch 82 of a type commonly used in direction signal indicating mechanisms and adapted to provide a plurality of circuit bridging relationships for the energization and deenergization of the various circuits of a vehicle signaling system. Such switches generally comprise a contact or bridging member enclosed within a housing for slidable movement across a terminal plate having a plurality of contacts therein. In the present invention the operating arm 84 of the switch 82 is positioned in a yoke formed by a pair of parallel lugs 86 extending from the ring member 30.

To provide for resetting the ring assembly 26 or switch operating mechanism to its neutral position the steering wheel 88 of the vehicle is formed with a hub 90 which carries a pair of downwardly depending dog ears 92. The dog ears 92 are formed on an annular ring 94 which is slidably mounted in an annular recess 96 formed by a plate 98 secured to the hub 90 and an annular ring 100 having its outer peripheral edge secured to plate 98 by turning the outer edge of plate 98 over the edge of ring 100 as shown. As it is considered desirable that the dog ears 96 be free to move relatively of the movement of the steering wheel to prevent locking of the steering wheel should a foreign object become lodged between the dog ears 92 and the circular dogs 52, a spring washer 102 such as for example the well-known Belleville washer is interposed between the annular ring 94 and the annular ring 100. With this arrangement the annular ring 94 has one surface in frictional engagement with the surface of plate 98 and will rotate therewith except where the frictional resistance is overcome by a force introduced as hereinbefore described, by the lodging of a foreign particle in the mechanism which would restrict movement of the dog ears 92.

In operation the lever 64 is moved manually from its neutral position to one of the operating positions corresponding with the direction of the turn of the vehicle; the extent of movement being limited by aperture 66. Movement of the lever 64 causes the ring assembly 26 to shift correspondingly in the housing with the edge 78 determining the path of movement. With such movement the operating arm 84 of the switch 82 is moved actuating the switch to connect a circuit indicating a turn in that direction. With such movement of the lever and ring assembly, one of the dogs 52 is placed in the path of the dog ears 92. Corresponding rotary movement of the steering wheel 88 causes engagement between the dog ear and the dog 52 in its path forcing the dog along a path determined by the oblong slots 56 until the dog ear clears the dog whereupon the dog is returned to its normal position in the slot 56 by the action of the spring 60. Upon reversal of direction of rotation of the steering wheel 88 to a straight directional path, the dog ear 92 again engages the dog 52 in its path forcing the dog, ring assembly and lever to shift in the housing to its neutral position, thereby clearing the path for the dog ear. Should a foreign object become lodged in the housing between the dog ear and circular dog causing the steering wheel to lock it will be seen that the frictional resistance of the engaging surfaces of plate 98 and annular ring 94 will be overcome permitting the steering wheel to be moved relatively with respect to the annular ring 94. As a further precaution against the locking of the steering wheel movement by a foreign object lodged between the circular dogs and dog ears it will be noticed that the oblong slots 44 and 46 permit the shifting of the ring assembly against the pressure of springs 50 to clear a path for the dog ears.

To provide a visual indication of the direction of turn contemplated by the operator of the vehicle, the terminals of switch 82 are connected in a plurality of circuits of a signaling system including right and left front and rear signaling lamps. As illustrated in Figure 6 of the drawing the system comprises a battery 104 having one terminal connected to ground through a conductor 106 and the other terminal connected through conductors 108 and 110 to the hinged armatures 112 and 114, respectively of a thermally controlled solenoid operated flasher 116. The other terminal of the battery 104 is also connected to one terminal of a normally open switch 118 through the conductors 108 and 120. Armatures 112 and 114 are provided with contacts 122 and 124 respectively which are normally out of engagement with fixed contacts 126 and 128. Armature 114 and contact 124 are connected by a conductor 130 of predetermined resistance which when not carrying current urges the armature 114 to a position where contacts 124 and 128 are out of engagement. Conductor 130 is connected to a resistor 132 by a conductor 134 and the resistor 132 has its opposite terminal connected by a conductor 136 to the fixed contact 128 and one terminal of the solenoid coil 138. The opposite terminal of the solenoid coil 138 is connected by a conductor 140 to one contact 142 of the terminal plate of switch 82. A circuit through the armature 112, contacts 122 and 126 is completed through a conductor 144, the filament 146 of a pilot lamp and conductor 148 to ground. A conductor 150 connects the other terminal of the normally open switch 118 to contact terminal 152 of the switch 82.

The right and left rear signaling lamps of the system have one side of their filaments 154 and 156 respectively connected by conductors 158 and 160 to terminals 162 and 164 of the switch 82 and the other terminals of filaments 154 and 156 are connected by conductors 166 and 168 to ground. The right and left front signaling lamps of the system have one terminal of their filaments 170 and 172 connected respectively by the conductors 174 and 176 to the contact terminals 178 and 180 of switch 82 and the other terminals of the filaments connected by conductors 182 and 184 to ground.

To provide the contact terminal bridging arrangements for the plurality of signaling circuits the sliding contact member of the switch 82 includes bridging bars 183, 185 and 186. These bridging bars are of a conducting material and are recessed in the sliding contact member for movement therewith.

In operation the neutral position of the switch 82 and the switch operating mechanism is as illustrated in Figures 1, 4 and 6 with contact terminals 152, 162 and 164 bridged by bridging bar 185. With the switch 82 in this position the filaments 154 and 156 of the right and left rear lamps may be energized by operation of the vehicle brake pedal which is adapted to simultaneously close the switch 118. Energization of the right and left rear lamp circuits provides a visual indication of the vehicle operator's intention to brake the vehicle to a stop. Current is carried to the lamp filaments 154 and 156 from the battery 104 through conductors 108, 120, switch 118, conductor 150, bridging bar 185 and the conductors 158 and 160.

To indicate a left turn the operating lever 84 of the switch operating mechanism is moved counterclockwise to its extreme position simultaneously actuating the switch arm 84 and causing the bridging bar 186 to bridge contact terminals 142, 164 and 180 and bridging contact 185 to shift, unbridging terminal contact 164 but retaining bridging engagement with contact terminals 152 and 162. Bridging bar 183 is simultaneously moved out of engagement with terminal contact 178. With this switching arrangement a circuit is completed from the battery 104 to the left, front and rear lamp filaments 146 and 172 through conductors 108 and 110, armature 114, hot wire resistance conductor 130, conductor 134, resistor 132, conductor 136, solenoid coil 138, conductor 140, bridging bar 186 and conductors 160 and 176. Current passing through the hot wire resistor 130 causes it to heat and simultaneously expand permitting the magnetic force of the solenoid coil 138 to attract armature 114 closing contact 124 on contact 128. This closure bypasses hot wire 130 and resistor 132 permitting sufficient current to pass through the solenoid coil 138 to attract armature 112 and close contact 122 on contact 126 completing a circuit from the battery 104 through conductors 108 and 110, armature 112, conductor 144 to the filament 146 to energize the pilot light. With contact 124 of armature 114 closed on contact 128 bypassing hot wire 130 and resistor 132, sufficient current passes in the circuits to filaments 156 and 172 to cause them to glow providing a signal light. As the bypassed hot wire cools it contracts urging the armature 114 to break the contact engagement between contacts 124 and 128 thereby placing resistor 132 back in the circuit and preventing sufficient current to flow to cause illumination of the filaments 156 and 172. With the flasher 116 in the circuits and operating as described, the left, front and rear filaments provide a flashing signal with the pilot light being illuminated during each cycle that sufficient current passes in the circuit of filaments 156 and 172 to cause them to become an illuminating source.

If it is desired to brake the vehicle to a stop, switch 118 is closed with the operation of the brake pedal completing circuits from the battery 104 through conductors 108 and 120, switch 118, conductor 150 bridging bar 185 and conductor 158 to filament 154. The filament 154 will then receive a steady flow of current from the battery to provide a constant source of illumination for the right rear lamp while the left front and rear lamps will be alternately flashed on and off by the action of the flasher 116.

To indicate a right turn the operating lever is moved clockwise and a similar circuit condition exists except that the switch 82 has the bridging bar 183 bridging contact terminals 142, 162 and 178 to provide for the intermittent flashing of the right front and rear lamps and bridging bar 185 engages contact terminals 152 and 164 while unbridging contact terminal 162. Consequently the right front and rear lamps will be subject to intermittent flashing and if the brake switch 118 is closed the left rear lamp filament will be subject to a constant flow of current and will provide a steady flow signal.

While the embodiment of the present invention herein disclosed constitutes a preferred form, it is to be understood that other forms might be adopted all coming within the scope of the claims which follow.

What we claim as new and desire to obtain by Letters Patent of the United States is:

1. A direction signal switch for automotive vehicles adapted to be mounted on the steering column thereof for manual operation comprising a housing, an operating plate mounted in said housing, said plate being provided with a guide track transversely disposed with respect to said housing and in non-concentric relation thereto, a ring assembly mounted on said plate for movement in said housing along a path determined by said track, and a switch mounted in said housing with its operating member in engagement with said ring for actuation thereby.

2. A direction signal switch for automotive vehicles adapted to be mounted on a steering column thereof for manual operation comprising a housing, an operating plate mounted in said housing, said plate being provided with a guide track transversely disposed with respect to said housing and in non-concentric relation thereto, one edge of said track being substantially arcuate, a ring assembly mounted on said plate for swinging movement in said housing along a path determined by said arcuate edge and a switch mounted in said housing with its operating arm in engagement with said ring assembly for actuation thereby.

3. A direction signal switch for automotive vehicles adapted to be mounted on the steering column thereof for manual operation comprising a housing, an operating plate mounted in said housing, said plate being provided with a guide track, a ring assembly mounted in said housing and on said plate for eccentric movement with respect to said housing as determined by said track, a switch mounted in said housing with its operating arm in engagement with said ring assembly for actuation thereby, and a lever attached to said ring and extending through said housing for actuating said ring.

4. A direction signal switch adapted to be mounted on the steering column of automotive vehicles for manual operation comprising a housing, a plate mounted in said housing, said plate having a transversely disposed guiding track, a ring assembly having spaced, spring urged, rollers thereon mounted on said plate for engagement of said rollers with said track, a switch mounted in said housing with its operating arm in engagement with said ring, and a lever attached to said ring and extending through said housing for effecting swinging movement of said ring.

5. A direction signal switch adapted to be mounted on the steering column of automotive vehicles for manual operation to energize and deenergize a plurality of signaling circuits in a direction signaling system comprising a housing, a plate mounted in said housing, said plate having a transversely disposed guiding track with a plurality of edges, a ring assembly mounted on said plate for relative movement therewith, said ring assembly having attached thereto a plurality of spaced rollers for engaging opposite edges of said track and guiding the movement of said ring in said housing, a switch mounted in said housing with its operating arm in engagement with said ring and a lever attached to said ring and extending through said housing for actuating said ring.

6. A direction signal switch adapted to be mounted on the steering column of an automotive vehicle for manual operation comprising a housing having means for attachment to said column, a plate mounted in said housing, said plate having a track with guiding edges, a ring assembly mounted on said plate for relative movement therewith, said ring assembly having a plurality of spaced rollers attached thereto for engaging the respective edges of said track, one of said rollers being shiftable with respect to said ring to permit simultaneous movement of said ring away from said plate and along said track, a switch mounted in said housing with its operating arm in engagement with said ring and a lever attached to said ring and extending through said housing for shifting said ring in said housing.

7. A direction signal switch adapted to be mounted adjacent the steering wheel of an automotive vehicle for manual operation from a neutral to an indicating position and for automatic operation to said neutral position from an indicating position in response to rotation of said steering wheel, said switch comprising a housing, a plate mounted in said housing, said plate having a track with radially spaced guiding edges, a ring assembly mounted on said plate for relative movement determined by said track, said ring having a plurality of spaced rollers attached thereto for engaging the respective edges of said track and a pair of spaced dogs mounted thereon for movement into and out of the inner space of said ring, springs yieldingly urging said dogs to project into said space, an operating arm connected to said ring and extending outwardly thereof through an aperture in said housing for shifting said ring along said track to place one of said dogs in the path of a dog ear associated with said steering wheel and a switch mounted in said housing with its operating arm in engagement with said ring for actuation thereby.

8. A direction signal switch adapted to be mounted adjacent the steering wheel of an automotive vehicle for manual operation from a neutral to an indicating position and for automatic operation to said neutral position from an indicating position in response to rotation of said steering wheel, said switch comprising a housing, a plate mounted in said housing, said plate having a track with guiding edges, one of which is substantially arcuate, a ring assembly mounted on said plate for relative movement along a substantially arcuate path determined by said track, said ring having a plurality of spaced rollers attached thereto for engaging the respective edges of said track and a pair of spaced dogs mounted thereon for movement into and out of the inner space of said ring, springs yieldingly urging said dogs into said space, an operating arm connected to said ring and extending outwardly thereof through an aperture in said housing for shifting said ring along said arcuate path to place one of said dogs in the path of a dog ear associated with said steering wheel and a switch mounted in said housing with its operating arm in engagement with said ring for actuation thereby.

9. A direction signal switch adapted to be mounted adjacent the steering wheel of an automotive vehicle for manual operation from a neutral to an indicating position and for automatic operation to said neutral position from an indicating position in response to rotation of said steering wheel, said switch comprising a housing, a plate mounted in said housing, said plate including a guide track, a ring assembly mounted on said plate for relative movement along said track, said assembly comprising a pair of attached rings with laterally offset portions forming spaced yokes about said attached rings, a plurality of spaced rollers mounted in one of said spaced yokes for engagement with opposite sides of said connecting member, one of said rollers being shiftable in said rings in a direction transverse of said connecting member, a spring yieldingly urging said rollers into engagement with said connecting member, a pair of dogs slidably mounted in the remaining spaced yokes for cooperation with a dog ear depending from said steering wheel to automatically reset said ring assembly to a neutral position in response to operation of the steering wheel, an electrical switch in said housing with its operating arm in engagement with said ring assembly and an operating lever attached to said ring assembly and extending through said housing.

10. In an automotive vehicle having a steering mechanism comprising a steering shaft, a steering column surrounding said shaft and a steering wheel attached to said shaft, said steering wheel having ears depending therefrom, a direction signaling device adapted to be mounted adjacent said steering wheel for manual operation from a neutral to an indicating position and for automatic operation to said neutral position from an indicating position in response to the rotation of said steering wheel, said device comprising a housing mounted on said steering column, a plate mounted in said housing, said plate including a guide track, a ring assembly mounted on said plate for relative movement along said track, said assembly comprising a pair of attached rings with laterally offset portions forming spaced yokes about said attached rings, a plurality of rollers mounted in one of said yokes on pins extending through said rings, one of said pins being shiftable in a direction transverse to said connecting member in slots in said rings, springs engaging the ends of said pins and yieldingly urging said rollers into engagement with opposite sides of said connecting member, a pair of dogs slidably mounted in the other spaced yokes and yieldingly urged into the inner space defined by said rings, one of said dogs being adapted upon movement of said ring assembly along said guide track to be placed in the path of said ears for returning said ring assembly to a neutral position in response to rotation of said steering wheel, an electrical switch mounted in said housing and actuated by said ring assembly and an operating arm attached to said ring assembly and extending through said housing.

CLOVIS W. LINCOLN.
PHILIP B. ZEIGLER.
JOSEPH J. VERBRUGGE.
JOHN F. SLOAN.

References Cited in the file of this patent

UNITED STATES PATENTS

| Number | Name | Date |
|---|---|---|
| 2,249,137 | Hill | July 15, 1941 |
| 2,276,413 | Moore | Mar. 17, 1942 |
| 2,284,936 | Wilshusen | June 2, 1942 |
| 2,531,377 | Lawson et al. | Nov. 21, 1950 |